Nov. 9, 1971                       H. GRAM                        3,618,334

CONTACT FREEZING APPARATUS

Filed Feb. 26, 1970                                        2 Sheets-Sheet 1

INVENTOR

Hans Gram

BY
Watson, Cole, Grindle & Watson
ATTORNEY

United States Patent Office 3,618,334
Patented Nov. 9, 1971

3,618,334
CONTACT FREEZING APPARATUS
Hans Gram, Vojens, Denmark, assignor to Brodrene
Gram A/S, Vojens, Denmark
Filed Feb. 26, 1970, Ser. No. 14,588
Claims priority, application Denmark, Feb. 27, 1969,
1,097/69
Int. Cl. F25c 1/10
U.S. Cl. 62—345                                            8 Claims

ABSTRACT OF THE DISCLOSURE

In a contact freezing apparatus elongated freezing elements are arranged side by side in the form of an endless band and are provided with inlet and outlet means extending through a slot of the same general shape as the endless band into a cabinet, in which means are provided for circulating a freezing medium through each freezing element via said inlet and outlet means.

BACKGROUND OF THE INVENTION

This invention relates to a contact freezing apparatus having movable freezing elements. In such contact freezing apparatus it is known to connect the freezing elements with a source of freezing medium through flexible hoses, slides and the like movable connecting elements. Connections of this type give rise to considerable sealing problems, particularly where the freezing elements move in a circling path.

SUMMARY OF THE INVENTION

According to the invention, a contact freezing apparatus comprises freezing elements arranged side by side in the form of an endless band movable in a closed path having a horizontal run, a cabinet arranged alongside said endless band and having a slot extending in a path substantially corresponding to that of said endless band, each of said freezing elements being provided with inlet and outlet means extending through said slot into the interior of said cabinet for circulating freezing medium through each of said freezing elements via said inlet and outlet means, while said element is present in positions in at least part of said horizontal run. In this apparatus, the freezing elements are fed with freezing medium inside the cabinet so that a closed circulation system for the freezing medium is obtained, while at the same time the band of freezing elements is readily accessible for the placing of goods to be frozen on the freezing elements or for the filling of pockets of the freezing elements with a liquid material to be frozen, the freezing elements travelling along the horizontal path forming an endless freezing table.

Preferably the endless band formed by said freezing elements runs across two rollers rotatably mounted on an outer wall of said cabinet.

In a preferred arrangement, the inlet and outlet means of said freezing elements are sealed relative to said cabinet by means of labyrinth glands, which will not to a substantial extent hamper the movement of the elements.

According to a preferred embodiment of the invention, said means for circulating freezing medium through said cabinet comprises a distributing pipe in said cabinet, and the inlet means of each freezing element comprises an upwardly open hopper for receiving freezing medium from said distributing pipe. In this manner, any form of direct mechanical connection between the source of freezing medium and the freezing elements is avoided, and the fact that freezing medium from the distributing pipe may miss the hopper and thus be spilled is of no avail, because such freezing medium will be collected in the bottom of the cabinet and can be recirculated into the freezing elements. The distributing pipe for the freezing medium need not extend along the whole length of the cabinet, but may terminate at a distance from the turning point of the band and be replaced by a distributing pipe for a thawing medium, if this is desired.

The outlet means of each freezing element may advantageously comprise an outlet tube opening above a screen plate arranged inside said cabinet at a level below the horizontal run of the path of movement of said freezing elements. In this manner, freezing medium leaving the freezing elements, while these move along the horizontal path, is prevented from flowing into freezing elements moving along the return run of the closed path of the endless band.

In a convenient arrangement, the labyrinth glands of the freezing elements comprise baffle plates mounted on tubes connecting said hoppers with said freezing elements and on said outlet tubes in co-operation with baffle plates fixedly mounted within said cabinet, the labyrinth glands being at least in part located between one side wall of said cabinet and a partition therein, the space between said side wall and said partition being provided with a drain outlet. Owing to this arrangement, the freezing elements may be cleaned by water jet washing, because washing water that may penetrate through the side wall of the cabinet will be caught by the partition and be conducted to the drain outlet so that contamination of the freezing medium with the washing water is avoided.

Preferably the baffle plates of adjacent freezing elements overlap each other so that no discontinuity of the sealing will occur when the freezing elements travel around the rollers. In this arrangement the baffle plates of each freezing element may advantageously be offset at one side to accommodate the overlapping portion of the baffle plates of the respective adjacent freezing element.

DESCRIPTON OF THE PREFERRED EMBODIMENT

Figure 3:
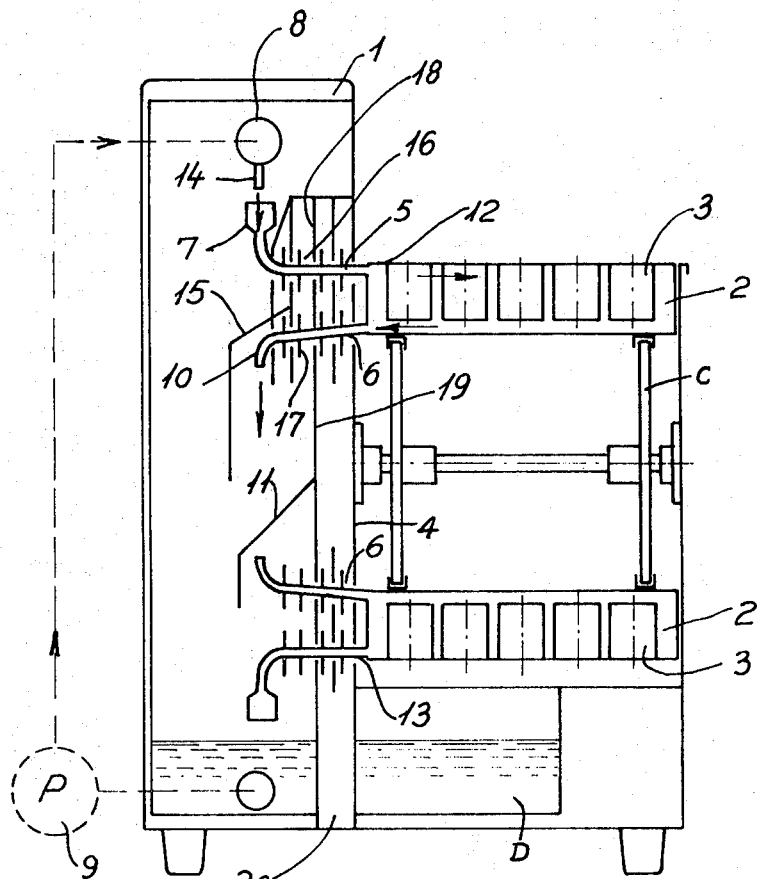
FIG. 3 is a section along the line III—III of FIG. 1.

In the drawing, 1 is a cabinet, along one side of which a multitude of freezing elements 2 are arranged. The freezing elements are connected with each other or attached to a belt in such a manner as to form an endless band A, which runs across two rollers B and C, one of which is shown as C in FIG. 3. The two rollers are rotatably mounted on the side wall 4 of the cabinet 1 for rotation about horizontal axes. When one of the rollers B or C is driven, the upper run of the endless band formed by the freezing elements will move along a horizontal path and will be readily accessible from the side remote from the cabinet 1.

In the embodiment shown in the drawing, the freezing elements 2 are constructed as elongated boxes having recesses or pockets 3 in the surface thereof facing upwards when the freezing elements travel along the upper run of the band. The pockets serve to receive the material to be frozen. However, it is also possible to increase the width of the freezing elements so that they lie close together and thereby form a substantially continuous travelling table.

At the end of each freezing element 2 adjacent the cabinet 1, there is an inlet tube 5 and an outlet tube 6, both tubes extending into the cabinet through a slot 12, 13 having a geometrical shape substantially corresponding to that of the endless band A. The inlet tube 5 is provided at its upper end with a hopper 7, which faces upwards when the freezing element 2 travels along the upper run of the band A. In the cabinet 1 there is provided a longitudinally extending freezing medium pipe 8 having a multitude of downwardly extending spouts 14 arranged at a mutual spacing corresponding to that of the freezing elements. Freezing medium D is supplied to the pipe 8 by means of a pump 9 collecting the freezing medium at the bottom of the cabinet 1. The outlet tube 6 of each freezing element 2 is bent, as shown at 10, such as to be downwardly directed when the freezing elements move along the upper run of their path. In the cabinet a screen plate 11 is provided under the ends of the freezing elements travelling along the upper run, thereby to prevent freezing medium D flowing out through the tubse 6, 10 from being caught by the outlet tube 6 of the freezing elements moving along the return run of the endless band A.

Figure 2:
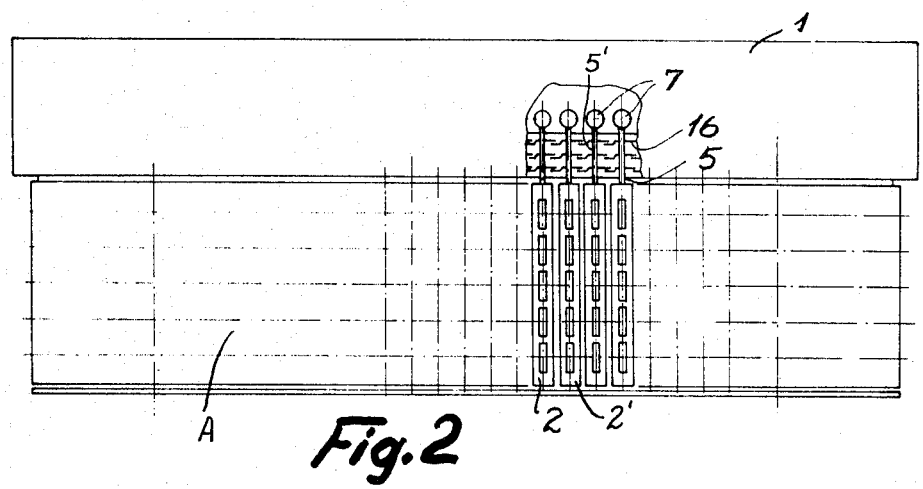
FIG. 2 is a diagrammatical top view of the contact freezing apparatus of FIG. 1.

The apparatus shown in the drawing is intended for intermittent operation, or in other words the band A performs a movement in steps corresponding to the distance from the middle of one freezing element 2 to the middle of the next freezing element 2' (see FIG. 2). During the periods of rest of the apparatus, a hopper 7 is in position under each of the spouts 14 so that freezing medium D flows into the hopper 7. During movement of the freezing elements 2, freezing medium will still flow out of the spouts 14 and this will not be caught by the hoppers 7, but will instead be deflected by means of a screen plate 15 so as to be collected in the bottom of the cabinet 1. To prevent freezing medium from flowing out of the cabinet along the surface of the inlet tubes 5, and also to prevent washing water from penetrating through the slots 12 and 13 from the outside, baffle plates 16 and 17 are mounted on the tubes 5 and 6, which baffle plates engage between stationary, mutually parallel baffle plates 18 along the upper run of the band so as to form labyrinth glands. Inside the cabinet, a partition 19 is provided which together with the side wall 4 of the cabinet 1 forms a trap for water that may penetrate from the outside. The space between the partition 19 and the side wall 4 of the cabinet is provided at its bottom with a drain outlet 20.

The baffle plates 16 and 17 on the tubes 5 and 6 of each two adjacent freezing elements 2, 2' have a width such as to overlap each other laterally, see FIG. 2, where this overlap is shown as far as the baffle plates 16 are concerned. Owing to this overlap there will be no discontinuity between these baffle plates when the freezing elements 2 travel around the rollers. It will be understood that during this travel the mutual distance of the inlet tubes 5, 5' of each two adjacent freezing elements 2, 2' will increase, but owing to the overlap of the baffle plates 16 the labyrinth glands will remain active. As is also apparent from FIG. 2, the baffle plates 16 are offset at one side to accommodate the overlapping portion of the baffle plate of the respective adjacent freezing element.

Figure 1:
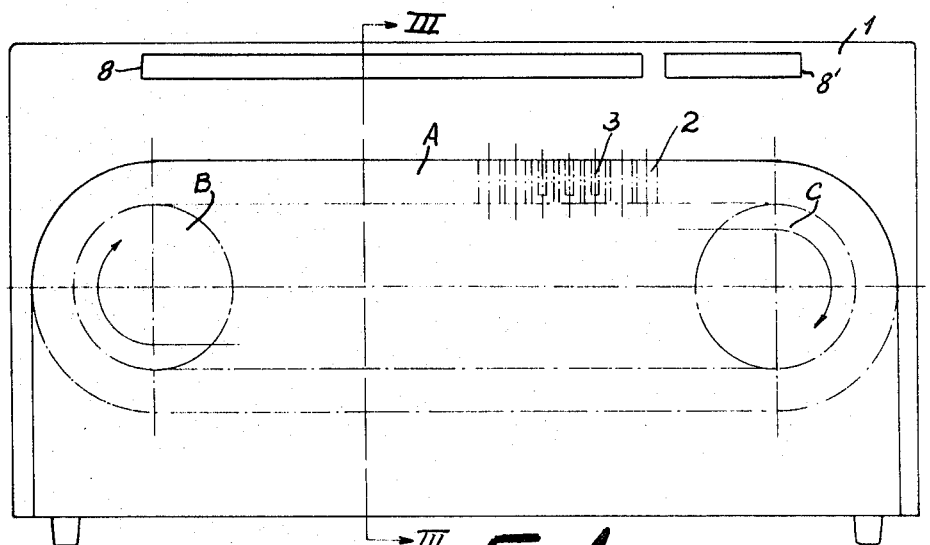
FIG. 1 is a diagrammatic side view of a contact freezing apparatus according to one embodiment of the invention.

In the embodiment shown in the drawing, where the freezing elements 2 are constructed with pockets 3, it is necessary to perform a brief heating of the pockets in order to loosen the frozen bodies from the walls of the pockets so as to enable them to be withdrawn therefrom. Therefore, the freezing medium distributing pipe 8 does not extend along the whole length of the upper run of the endless band A, but terminates at a distance from the turning point of the band. Instead, a distributing tube 8' (see FIG. 3) for a thawing medium is provided along the remainder of the length of the upper run of the band A, which distributing tube may be constructed in the same manner as the distributing pipe 8 and supplies thawing medium to the hoppers 7 during the last part of the travel of the freezing elements 2 along the upper run. To prevent mixing of the freezing medium and the thawing medium a partition, not shown, is provided which separates the last part of the cabinet (to the right in FIG. 1) from the remaining part of the cabinet.

The heat transferred to the freezing medium is removed by means of a refrigerating coil (not shown) which is arranged at the bottom of the cabinet in the sump, from which the pump 9 collects freezing medium for circulation through the freezing elements.

I claim:

1. A contact freezing apparatus comprising freezing elements arranged side by side in the form of an endless band movable in a cloesd path having a horizontal run, a cabinet arranged alongside said endless band and having a slot extending in a path substantially corresponding to that of said endless band, each of said freezing elements being provided with inlet and outlet means extending through said slot into the interior of said cabinet, means being provided in said cabinet for circulating freezing medium through each of said freezing elements via said inlet and outlet means, while said element is present in positions in at least part of said horizontal run.

2. A contact freezing apparatus as in claim 1, in which the endless band formed by said freezing elements runs across two rollers rotatably mounted on an outer wall of said cabinet.

3. A contact freezing apparatus as in claim 1, in which the inlet and outlet means of said freezing elements are sealed relative to said cabinet by means of labyrinth glands.

4. A contact freezing apparatus as in claim 1, in which said means for circulating freezing medium through said cabinet comprises a distribuitng pipe in said cabinet, and the inlet means of each freezing element comprises an upwardly open hopper for receiving freezing medium from said distributing pipe.

5. A contact freezing apparatus as in claim 4, in which the outlet means of each freezing element comprises an outlet tube opening a screen plate arranged inside said cabinet at a level below the horizontal run of the path of movement of said freezing elements.

6. A contact freezing apparatus as in claim 4, in which said labyrinth glands comprise baffle plates mounted on tubes connecting said hoppers with said freezing elements and on said outlet tubes in co-operation with baffle plates fixedly mounted within said cabinet, the labyrinth glands being at least in part located between one side wall of said cabinet and a partition therein, the space between said side wall and said partition being provided with a drain outlet.

7. A contact freezing apparatus as in claim 6, in which the baffle plates of adjacent freezing elements overlap each other.

8. A contact freezing apparatus as in claim 7, in which the baffle plates of each freezing element are offset at one side to accommodate the overlapping portion of the baffle plates of the respective adjacent freezing element.

References Cited

UNITED STATES PATENTS 2,117,658   5/1938   Gilliam _____ 62—345 X
2,414,264   1/1947   Kirkpatrick _____ 62—345

WILLIAM E. WAYNER, Primary Examiner

U.S. Cl. X.R.
62—381; 165—86